US008832769B2

(12) United States Patent
Migos

(10) Patent No.: US 8,832,769 B2
(45) Date of Patent: Sep. 9, 2014

(54) REMOTE CONTROL BASED OUTPUT SELECTION

(75) Inventor: Charles J. Migos, San Franciscso, CA (US)

(73) Assignee: Microsoft Corporation, Redmond, WA (US)

( * ) Notice: Subject to any disclaimer, the term of this patent is extended or adjusted under 35 U.S.C. 154(b) by 1359 days.

(21) Appl. No.: 11/974,738

(22) Filed: Oct. 16, 2007

(65) Prior Publication Data

US 2009/0100474 A1 Apr. 16, 2009

(51) Int. Cl.
*H04N 7/173* (2011.01)

(52) U.S. Cl.
USPC ................. 725/133; 725/44; 725/46; 725/47; 725/52; 725/61; 725/141; 725/153; 340/2.6; 340/825.69; 340/825.24; 340/825.25; 340/825.72; 348/734; 348/705; 348/706; 341/176; 398/111; 398/112; 370/450

(58) Field of Classification Search
USPC ........... 725/44, 46, 47, 52, 61, 133, 141, 153; 340/2.6, 825.69, 825.24, 825.25, 340/825.72; 348/734, 705–706; 341/176; 398/111–112; 370/450
See application file for complete search history.

(56) References Cited

U.S. PATENT DOCUMENTS 4,626,848 A 12/1986 Ehlers
5,410,326 A 4/1995 Goldstein
5,851,149 A 12/1998 Xidos et al.
6,081,263 A * 6/2000 LeGall et al. ................. 715/760
6,129,633 A 10/2000 Lee
6,182,094 B1 * 1/2001 Humpleman et al. ........ 715/234
6,278,499 B1 * 8/2001 Darbee et al. ................. 348/734
6,346,891 B1 * 2/2002 Feinleib et al. .......... 340/825.69
6,359,661 B1 * 3/2002 Nickum ........................ 348/734
6,724,339 B2 * 4/2004 Conway et al. ............... 341/176
6,980,150 B2 * 12/2005 Conway et al. ............... 341/176
7,111,320 B1 * 9/2006 Novak .......................... 725/139
7,169,049 B2 1/2007 Leifer (Continued)

FOREIGN PATENT DOCUMENTS

WO WO 2006095290 A2 * 9/2006

OTHER PUBLICATIONS

Borchers, et al., "Stanford Interactive Workspaces: A Framework for Physical and Graphical User Interface Prototyping", Wireless Communications, IEEE vol. 9, Issue 6—Retrieved from: <http://elara.tk.informatik.tu-darmstadt.de/publications/2002/stanford.pdf> on May 25, 2007, Dec. 2002, 13 pages.

*Primary Examiner* — Jason Salce
(74) *Attorney, Agent, or Firm* — Micah Goldsmith; Glen Johnson; Micky Minhas

(57) ABSTRACT

Remote control based output selection techniques are described in which an output to a display device is selected based on identification of a remote control device that is manipulated by a user. In an implementation, each of a plurality of remote control devices is associated with a respective client device in an audio visual system. When a user manipulates one of the plurality of remote control devices, the manipulated remote control device is detected and a corresponding client device is determined. Then, an output to a display device is set to present audio visual data from the determined client device. In another implementation, when a manipulated remote control device is identified, a user interface for output on the display device is configured according to the identified remote control device and/or the functional capabilities of the identified remote control device.

20 Claims, 6 Drawing Sheets

(56) References Cited

U.S. PATENT DOCUMENTS

| | | | | |
|---|---|---|---|---|
| 7,190,345 | B2 | 3/2007 | Nashida et al. | |
| 7,378,984 | B2 * | 5/2008 | Suzuki et al. | 340/825.69 |
| 7,394,450 | B2 * | 7/2008 | Shibamiya et al. | 345/156 |
| 7,647,610 | B2 * | 1/2010 | Kim | 725/46 |
| 2002/0059588 | A1 * | 5/2002 | Huber et al. | 725/35 |
| 2002/0059637 | A1 | 5/2002 | Rakib | |
| 2002/0171624 | A1 * | 11/2002 | Stecyk et al. | 345/156 |
| 2004/0257337 | A1 * | 12/2004 | Shibamiya et al. | 345/156 |
| 2005/0005288 | A1 * | 1/2005 | Novak | 725/32 |
| 2005/0046751 | A1 | 3/2005 | Simmons | |
| 2005/0137018 | A1 | 6/2005 | Dernis et al. | |
| 2006/0038698 | A1 | 2/2006 | Chen | |
| 2006/0053444 | A1 * | 3/2006 | Rudolph et al. | 725/38 |
| 2006/0156353 | A1 * | 7/2006 | Dorner | 725/86 |
| 2006/0288370 | A1 * | 12/2006 | Rothschild | 725/51 |
| 2007/0054735 | A1 | 3/2007 | Palermo | |
| 2007/0058047 | A1 | 3/2007 | Henty | |
| 2007/0277195 | A1 * | 11/2007 | Nishigaki | 725/34 |
| 2008/0098426 | A1 * | 4/2008 | Candelore | 725/38 |
| 2009/0113417 | A1 * | 4/2009 | Vrijsen | 717/178 |
| 2009/0228911 | A1 * | 9/2009 | Vrijsen | 725/14 |
| 2009/0243874 | A1 * | 10/2009 | Sato | 340/825.22 |

* cited by examiner

REMOTE CONTROL BASED OUTPUT SELECTION

BACKGROUND

Users may use a variety of devices in an entertainment system, such as a set-top box, television, stereo, game device, DVD player, DVR and so forth. Thus, a user may switch back and forth between interacting with different devices, each being connected to a single display device. Traditionally, a user manually selected different inputs on a display device to use different devices at different times. Therefore, the user had to remember and manually set inputs for a display device each time a different device was to be used, which was frustrating to the user.

Further, user interfaces output by a client device have traditionally been configured with fixed functionality. Accordingly, an electronic programming guide (EPG) or other overlaid interface was the same regardless of the functional capabilities of a remote control device used to interact with the EPG. Therefore, the ability to customize the EPG using traditional techniques was limited, which detracts from the user experience.

SUMMARY

Remote control based output selection techniques are described in which an output to a display device is selected based on identification of a remote control device that is manipulated by a user. In an implementation, each of a plurality of remote control devices is associated with a respective client device in an audio visual system. When a user manipulates one of the plurality of remote control devices, the manipulated remote control device is detected and a corresponding client device is determined. Then, an output to a display device is set to present audio visual data from the determined client device.

In another implementation, when a manipulated remote control device is identified, a user interface for output on the display device is configured according to the identified remote control device and/or the functional capabilities of the identified remote control device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
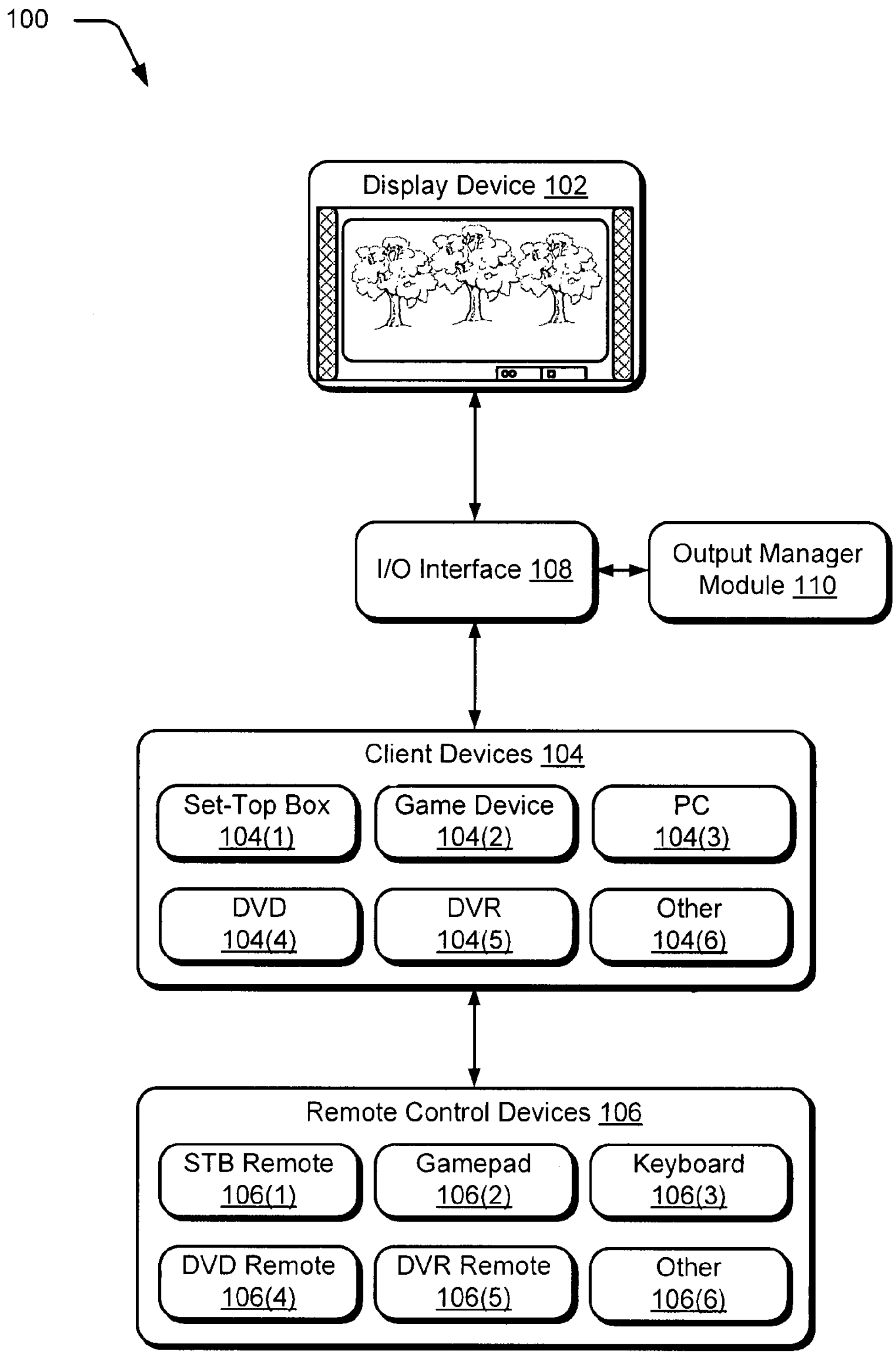
FIG. 1 is an illustration of an environment in an exemplary implementation that is operable to employ remote control based output selection techniques.

A user's home entertainment system may include a variety of devices, such as a set-top box, television, stereo, game device, DVD player, DVR and so forth. To use different device at different times, a user has traditionally manually selected different inputs, such as selecting different channels or input of a television set. To do this, the user must remember which devices are connected to which inputs which may be confusing and frustrating to the user.

Further, the variety of devices may correspond respectively to a variety of remote control devices. Each remote control device may provide different ways of inputting data, such as a number pad of a television remote, a joystick of a game controller, and so on. However, traditional user interfaces which may be output by one of the devices were designed for the particular device and the corresponding remote control. Thus, the functionality of a traditional user interface for a television may be designed with the television remote in mind. The television user interface may remain the same even if a different remote device, such as the game controller, is used to interact with the television user interface. Thus, traditional user interfaces were not designed to take advantage of different functionalities which may be provided by different remote control devices.

Remote control based output selection techniques are described in which an output to a display device is selected based on identification of which remote control device is manipulated by a user. Each of a plurality of remote control devices may be associated with a respective client device in an audio visual system, such as a user's home entertainment system. When a user manipulates one of the remote control devices, the remote control device being used is detected.

In an implementation, an output to a display device is selected to correspond to a remote control that is detected as being used by a user. For example, assume a television is connected to a cable box and a game console via respective inputs "input 1" and "input 2". When a user uses a remote control for the cable box, the television may be set to display television content from the cable box. In other words, "input 1" is automatically selected. When a user uses a game controller for the game console, the television may be set to display game content from the game console. In other words, "input 2" is automatically selected.

In another implementation, a user interface for output on the display device is configured based upon a remote control is detected as being used by a user. For example, cable box may configure and output an electronic programming guide (EPG) which includes features customized according to identification of a remote control used to interact with the EPG. By way of example, assume that the remote control for the cable box includes an alpha-numeric keypad. Thus, when a user uses a remote control for the cable box to interact with the EPG, the EPG may be configured to include a data entry field that accepts direct entry of text (e.g., search functionality). The game controller may not include functionality for direct entry of text. Thus, when a user uses a game controller for the game console to interact with the EPG, the EPG may be configured with a text selection portion which may be operated via the joystick of the game controller to input text, rather than having the direct textual entry feature. Thus, a user interface may be configured differently for different remote control devices.

In the following discussion, an exemplary environment is first described that is operable to perform remote control based output selection techniques. Exemplary procedures are then described that may be employed in the exemplary environment, as well as in other environments. Although these techniques are described as employed within a television environment in the following discussion, it should be readily apparent that these techniques may be incorporated within a variety of environments without departing from the spirit and scope thereof.

Exemplary Environment

FIG. 1 is an illustration of an environment 100 in an exemplary implementation that is operable to employ remote control based output selection techniques described herein. The illustrated environment 100 includes a display device 102, a plurality of client devices 104 and a plurality of remote control devices 106 configured to operate the plurality of client devices 104.

The plurality of client devices 104 may be configured in a variety of ways, examples of which include but are not limited to: a set-top box 104(1), a game device 104(2) or console, a personal computer (PC) 104(3), a DVD 104(4) player, and a DVR 104(5). Other client devices 104(6) are also contemplated such as personal digital assistant (PDA), a mobile phone, an audio visual receiver, a digital camera, a projector, a portable multi-media player and so forth. The plurality of client devices 104 may be representative of a variety of different entertainment and/or multi-media components which may be interconnected one to another within the environment 100. In particular, the plurality of client devices 104 may be arranged to provide different audio visual (A/V) outputs for presentation via the common display device 102.

The plurality of remote control devices 106 is depicted as including: a set-top box remote 106(1), a game pad 106(2), a keyboard 106(3), a DVD remote 106(4), a DVR remote 106(5). Other 106(6) remote control devices corresponding to other devices 104(6) are also contemplated. In an implementation, each of the plurality of remote control devices 106 corresponds to a respective one of the plurality of client devices 104. For example, game device 104(2) has a corresponding gamepad 106(2) to operate the game device 104(2); PC 104(3) has a corresponding keyboard 106(3); and so forth.

The plurality of client devices 104 is further illustrated as being communicatively coupled to the display device 102 via an input/output (I/O) interface 108. The I/O interface 108 represents functionality to connect and selectively switch between A/V outputs from the plurality of client devices 104 to present different outputs on the display device 102. I/O interface may include various inputs to communicatively couple the outputs from the plurality of client devices 104 to the display device 102. Thus, through the I/O interface 108, each of the plurality of client devices 104 may provide A/V output(s) for presentation on the display device 102. Naturally, a single A/V output may be presented in a "full-screen" and/or multiple A/V outputs (e.g., sources) may be presented simultaneously, such as using picture-in-picture, picture-by-picture, overlays and so forth.

The I/O interface 108 may include a variety of wireless and/or wired connections to the plurality of client devices 104 to provide communication of A/V outputs from the plurality of client devices 104 to the display device 102. For example, functionality for wireless connections to one or more of the plurality of client devices 104 may be provided via Institute of Electrical and Electronics Engineers, Inc., (IEEE) 802.11 standards and/or other wireless standards and protocols. Additionally or alternatively, hardware and connectors for various wired connections are also contemplated. A variety of different types of wired connections are contemplated, examples of which include but are not limited to: component video connections, composite audio/video, high-definition multimedia interface (HDMI), digital visual interface (DVI), S-video, optical audio, digital audio, and combinations thereof.

The I/O interface 108 may represent functionality for a variety of different selectable inputs (e.g., sources) which may be configured to provide a variety of types of audio and/or visual connections. The I/O interface 108 may include one or more outputs which may be connected to the display device 102, as well as to other output devices (e.g., speakers, monitor, printer etc.)

The plurality of client devices 104 may be interconnected one to another in a variety of arrangements via the multiple connections of the I/O interface 108 and/or similar connections that may be provided with the plurality of client devices 104. Each of the plurality of client devices 104 may be connected directly (e.g., direct connection to the I/O interface 108) or indirectly (e.g., via another one of the plurality of client devices 104) to the display device 102. While I/O interface 108 is depicted as a stand-alone device in FIG. 1, the I/O interface 108 may be integrated with the display device 102. In an implementation, the I/O interface 108 or portions thereof may also be implemented via one or more of the plurality of client devices 104, further discussion of which may be found in relation to FIG. 2.

An output manger module 110 is depicted which represents functionality to manage and operate the I/O interface 108 to present selected A/V output(s) on the display device 102. For instance, output manger module 110 may implement hardware, software, and/or logic to determine which A/V outputs to present via the display device 102, and to switch the I/O interface 108 to provide the selected output. In accordance with techniques described herein, the selection of A/V outputs may be based on detection and identification of a particular one of the plurality of remote control devices 106, further discussion of which may be found in relation to the following figures.

The plurality of remote control devices 106 may communicate commands, instructions, data, identifiers, and other inputs which may be processed to control operation of the plurality of client devices 104. The plurality of remote control devices 106 may communicate according to a variety of communication protocols such as radio frequency (RF), infrared (IR), Institute of Electrical and Electronics Engineers, Inc. (IEEE) 802.11 wireless standards, and/or other suitable communication protocols. Wired communications are also contemplated, such as via universal serial bus (USB), Ethernet cable, fiber optic cable, and so forth.

While each of the plurality of remote control devices 106 may correspond to a respective one of the plurality of client devices 104, the plurality of remote control devices are not limited to control of a single device. For example, each of the plurality of remote control devices 106 may include some functionality to operate other devices, such as being able to toggle power and/or to interact with menus, programming guides, and other user interfaces that may be available from the plurality of client devices 104. Thus, while playing a game using a game device 104(2), a user may manipulate a corresponding gamepad 106(2) to access and interact with an electronic programming guide (EPG) provided by the set-top box 104(1). Similarly, gamepad 106(2) may be manipulated to access a menu and/or content list of the DVR 104(5). In another example, a keyboard 106(3) corresponding to a PC 104(3) may provide functionally to operate the DVD 104(4) device. A variety of other examples are also contemplated.

It should be noted that one or more of the entities shown in FIG. 1 may be further divided (e.g., the output manager module 102 may be implemented by a combination of the plurality of client devices 104 in a distributed computing system), combined (e.g., the display device 102 may incorporate the I/O interface 108), and so on. Further the I/O interface 108 and output manger module 110 may be provided by different respective components. For example, display device 102 may include the I/O interface 108 which is operated via an output manger module 110 that is implemented as a component of the gaming device 104(2). Thus, the environment 100 of FIG. 1 is illustrative of one of a plurality of different environments that may employ the described techniques.

Generally, any of the functions described herein can be implemented using software, firmware, hardware (e.g., fixed-logic circuitry), manual processing, or a combination of these implementations. The terms "module", "functionality", ".engine" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices. The features of the techniques to provide remote control based output selection are platform independent, meaning that the techniques may be implemented on a variety of commercial computing platforms having a variety of processors.

Figure 2:
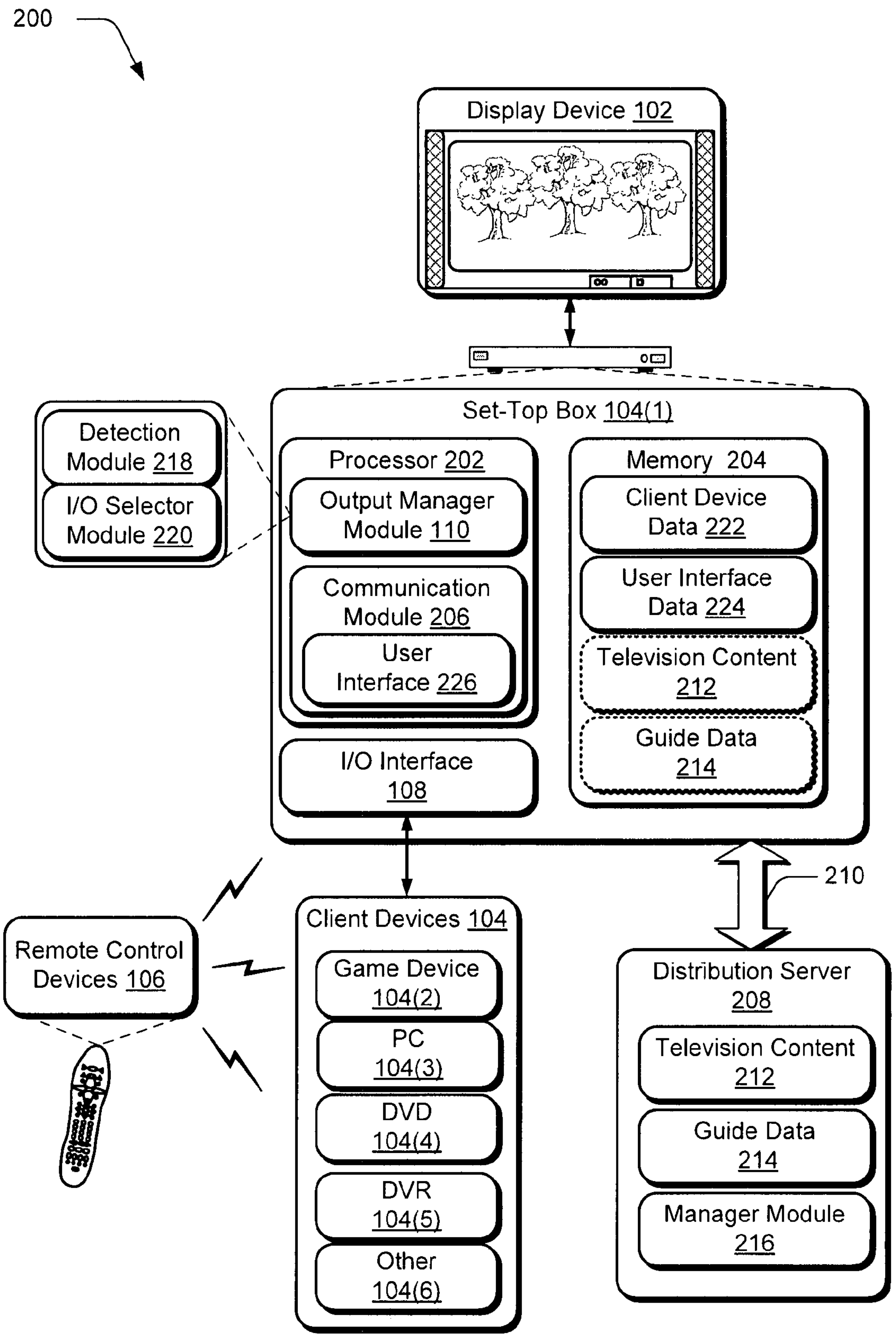
FIG. 2 is an illustration of an embodiment of an exemplary system, showing aspects of the clients and remote controls of FIG. 1 in greater detail.

FIG. 2 is an illustration of an embodiment of an exemplary system 200 depicting aspects of the client devices and corresponding remote control devices of FIG. 1 in greater detail. The system 200 may represent a portion of a home entertainment system having multiple entertainment components. A variety of other audio visual systems are also contemplated.

In the example of FIG. 2, the I/O interface 108 and output managers module 110 of FIG. 1 are depicted as implemented via a set-top box 104(1). While the set-top box 104(1) is illustrated by way of example, functionality to perform techniques for remote control based output selection may be implemented by one or more of the plurality of client devices 104, alone or in combination. It is noted that the I/O interface 108 and/or output manager module 110 may also be implemented as a stand-alone device.

In the illustrated example a plurality of client devices 104 (e.g., client devices 104(2)-104(6)) are connected to the set-top box 104(1) via multiple inputs to the I/O interface 108. Output from the set-top box 104(1) may also be connected to the I/O interface 108. I/O interface 108 may also provide one or more output connections to the display device 102. Thus, in the depicted example, A/V outputs from the plurality of clients 104 are routed through set-top box 104(1). I/O interface 108 may be operated to selectively switch between presentation of A/V outputs from the plurality of clients 104, as well as from the set-top box 104(1), on the display device 102. The plurality of remote control devices 106 is illustrated as communicating various commands to control operation of the plurality of client devices 104.

The exemplary set-top box 104(1) is illustrated as executing the output manager module 110 and communication module 206 on a processor 202, each of which is also storable in memory 204. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Additionally, although a single memory 204 is shown for the set-top box 104(1), a wide variety of types and combinations of memory may be employed, such as random access memory (RAM), hard disk memory, removable medium memory, and other types of computer-readable media.

The illustrated communication module 206 is executable on the set-top box 104(1) to interact with a distribution server 208 via a network 210. In particular, the communication module 206 may represent functionality to search, obtain, process, manage and output television content 212 and guide data 214 that may be available via the distribution server 208. In the following discussion, television content may also be referred to simply as "content". While a single network 210 is shown, the depicted network 210 may represent connections achieved using a single network or multiple networks. For example, network 210 may be representative of a broadcast network with back channel communication, an Internet Protocol (IP) network, and so on. Communication module 206 may operate to downloaded and store content 212 and guide data 214, which is represented in phantom in memory 204.

Communication module 206 may further represent functionality to control playback of content 212 on the set-top box 104(1), such as through the use of one or more "command modes", i.e., "trick modes", to tune to a particular channel, order pay-per-view content, and so on. The command modes may provide non-linear playback of the content 212 (i.e., time shift the playback of the content 212) such as pause, rewind, fast forward, slow motion playback, and the like. Communication module 206 may also operate to output an electronic programming (EPG) based upon received guide data 214. Set-top box 104(1) typically includes hardware and/or software which may be operable via the communication module 206 to transport and decrypt content 212 and the EPG data 214 received for rendering by a display device. Thus, communication module 206 may represent a variety of functionality to search, obtain, process, manage and output the television content 212 and the guide data 214 from distribution server 208.

The distribution server 208 may represent a component of a network operator (e.g., a head-end) that is configured to receive and manage content 212 from one or more content providers (not shown). A variety of content providers may broadcast television content 212 over a network connection to a multiplicity of network operators, an example of which is represented as distribution server 208. The distribution server 208 may then stream the television content 212 over a network (e.g., network 210) to a multitude of clients, an example of which is illustrated as set-top box 104(1). The set-top box 104(1) may then store the television content 212 in the memory 204 or output television content 212 immediately for output as it is received. The television content 212 provided via distribution server 208 may include a variety of data, such as television programming, video-on-demand (VOD) files, and so on. Naturally, the distribution server 208 may include memory to store content 212 and other data, as well as one or more processors to execute program modules and instructions.

Guide data 214 may be provided via the network 210 to configured and/or output an electronic programming guide (EPG). The guide data 214 may be obtained from an EPG database for broadcast to the set-top box 104(1), such as through use of a carousel file system. The carousel file system repeatedly broadcasts the guide data 214 over an out-of-band (OOB) channel, such as over the network 210 or another network. Distribution from the distribution server 208 may be accommodated in a number of ways, including cable, radio frequency (RF), microwave, digital subscriber line (DSL), satellite, via Internet Protocol (IP) connection, and so on. Although the guide data 214 is illustrated as being provided by the distribution server 208 for the sake of simplicity of the figure, it should be readily apparent that the guide data 214 may originate from a wide variety of sources, such as a stand-alone third-party service.

The distribution server 208 is also illustrated as including a manager module 216 that is representative of functionality to configure television content 212 for output (e.g., streaming) over the network 210 to the set-top box 104(1). The manager module 216, for instance, may configure content 212 received from one or more content providers to be suitable for transmission over the network 210, such as to "packetize" the content for distribution over the Internet, configuration for a particular broadcast channel, map the television content 212 to particular channels, and so on. Thus, the set-top box 104(1) may be operated to interact with the distribution server 208 to obtain content 112 which may be output on the display device 102 and to obtain guide data 214 which may be used to configure an EPG or other interface.

Output manager module 110 is depicted as including a detection module 218 and an input output (I/O) selector module 220. Detection module 218 represents functionality to determine when one of the plurality of remote control devices 106 is being manipulated by the user and/or to identify the remote control device. I/O selector module 220 represents functionality to cause sending of selected A/V output to the display device 102. In an implementation, the selection of A/V output may be based on which of the plurality of remote control devices. 106 is detected via the detection module 218, further discussion of which nay be found with respect to FIG. 3-4.

A variety of client device data 222 and a variety of user interface data 224 is illustrated as stored in memory 204 of set-top box 104(1). The communication module 206 is also illustrated as outputting a user interface 226, which may be based at least in part on the user interface data 224. While client device data 222 and user interface data 224 are depicted as stored locally at the set-top box 104(1), the client device data 222 and user interface data 224 or portions thereof may be stored and accessed via one or more of the plurality of client devices 104. Further, client device data 222 and/or user interface data 224, or portions thereof, may be available for download from a network location, such as from the distribution server 208 or another network service.

The client device data 222 is representative of data which may describe the plurality of client devices 104 and their arrangement one to another. The client device data 222 may be configured to include a variety of different data such as remote identifiers, device identifiers, manufacturer identifiers, remote control codes, input/output connection data, and so forth. More particularly, client device data 222 may describe associations between the plurality of remote control devices 106 and the plurality of client devices 104. In other words, the client device data 222 may match each of the plurality of remote control devices 106 to a respective one of the plurality of client devices 104.

The client device data 222 may also describe connections of the plurality of client devices 104 one to another and/or to the I/O interface 108. For example, the client device data 222 may describe how the I/O interface 108 is connected to the plurality of client devices 104 and how the outputs from the I/O interface 108 are connected to the display device 102. In other words, the client device data 222 may match the plurality of client devices 104 to particular inputs and outputs in the system 200. Thus, the client device data 222 may be referenced to configure the I/O interface 108 to send a selected A/V output from one of the plurality of client devices 104 to the display device 102. For example, detection module 218 and/or the I/O selector module 220 may reference the client device data 222 to identify a manipulated remote control device and to cause presentation of corresponding A/V output on the display device 102. The client device data 222 may be generated and stored at the set-top box 104(1) when a user sets up the system 200 and/or when components of the system are changed, added, or removed.

The user interface data 224 may represent a database which includes data to configure various embodiments of the user interface 226. In an implementation, user interface data 226 may specify characteristics of a user interface 226 to match a remote control device that is detected via the detection module 218 and/or the functional capabilities of the detected remote control device. User interface data 224 may include a collection of pre-configured versions of a user interface 226 which may be alternately selected and output by operation of the communication module 206. Additionally or alternatively, user interface data 224 may include a variety of data sufficient to form a user interface 226 that corresponds to a particular remote control device.

User interface 226 may be configured in a variety of ways to provide various interactions with the plurality of client devices 104 to a user. For instance, a user interface 226 may be configured to display television content 212, arrange guide data 214, expose interactive windows, and combinations thereof. Communication module 206 may be further representative of functionality that may be employed to generate, configure, and manage one or more user interfaces 226 to provide the various interactions.

In an embodiment, a user interface 226 may incorporate an electronic programming guide (EPG) which is output based on the guide data 214. It is noted that the user interface 226 may also be configured to display the EPG at the same time as television content 212 from the set-top box 104(1) and/or other A/V outputs from the plurality of client devices 104, such as in different portions of the user interface 226, using overlays, and so forth. As noted, configuration of the user interface 226 may be based upon which of the plurality of remote control devices 106 is detected by the detection module 218 and/or the functional capabilities of a detected remote control device, further discussion of which may be found in relation to FIGS. 4-5.

Exemplary Procedures

The following discussion describes techniques related to remote control based output selection that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIG. 1 and the system 200 of FIG. 2.

Figure 3:
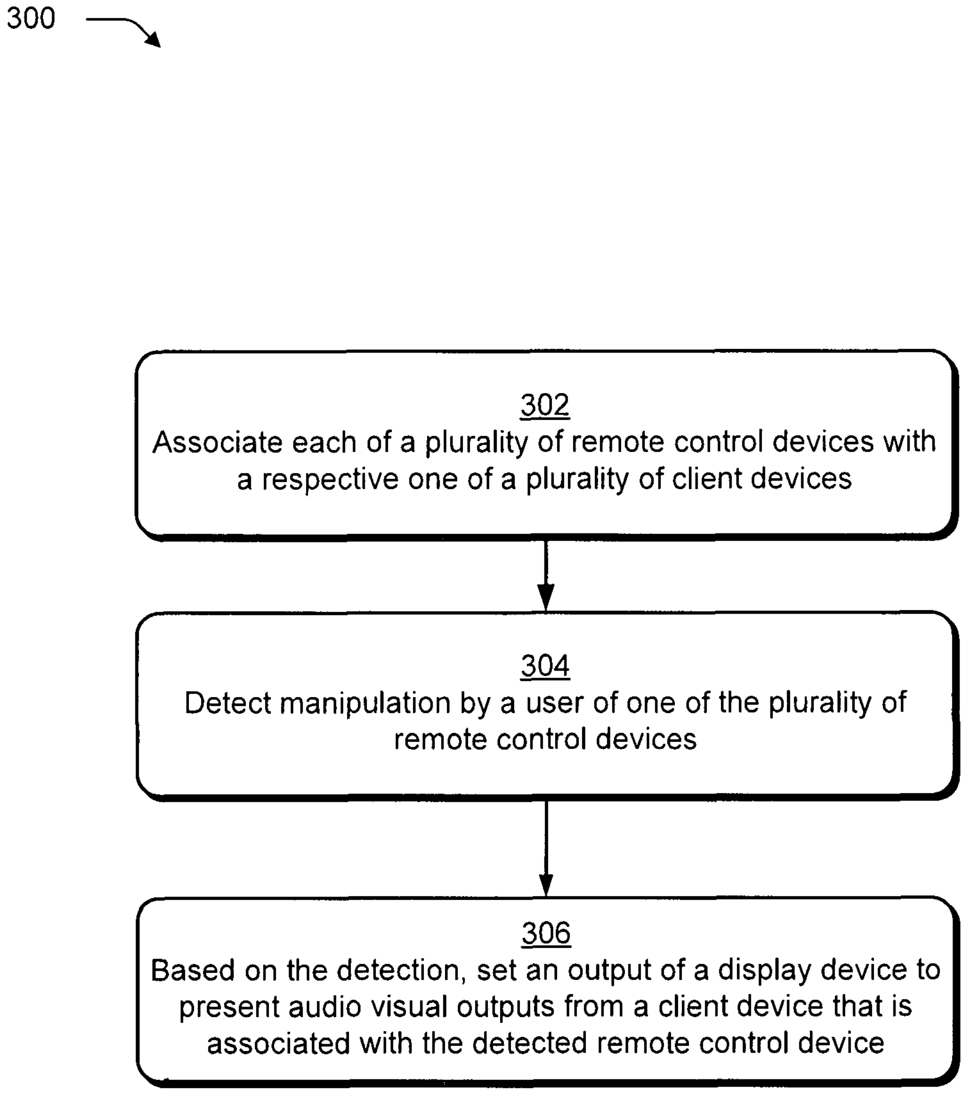
FIG. 3 is a flow diagram depicting a procedure in an exemplary implementation in which output to a display device is set based upon detection of a corresponding remote control device.

FIG. 3 depicts a procedure 300 in an exemplary implementation in which output to a display device is set based upon detection of a corresponding remote control device. Each of a plurality of remote control devices is associated with a respective one of a plurality of client devices (block 302). For example, a home entertainment system may include a plurality of client devices 104 and a plurality of remote control devices 106 as illustrated in FIG. 1. It is noted that the plurality of client devices 104 may be arranged to provide respective audio visual outputs to a common display, such as depicted display device 102. For instance, the I/O interface 108 may be communicatively coupled to each of the plurality of client devices 104 and may be operated to send different outputs to the display device 102 at different times.

A variety of data may be maintained to describe the plurality of clients devices 104, arrangement of the plurality of clients devices 104 in the home entertainment system (e.g., how the devices are connected on to another), the plurality of remote controls 106, and/or associations thereof. The arrangement of the home entertainment system may be input by a user, automatically detected through various connections, and/or through combinations of these techniques. In one technique, client device data 222 as in FIG. 2 may be stored to describe the arrangement and associations of components in the home entertainment system. Client device data 222 may be stored locally in memory of one or more of the plurality of client devices 104 (an example of which is memory 204 of set-top box 104(1) in FIG. 2) or in other suitable storage, such as remote network storage location.

In an embodiment, client device data 222 may include an identifier of each of the plurality of remote control devices 106 or equivalent identifying data which may be used to associate each of the remote control devices 106 with a respective one of the plurality of client devices 104, and/or with corresponding input/output connections. For example, referring to the example remote control devices 106 of FIG. 1, the gamepad 106(2) may be identified as “remote 2” and the DVD remote 106(4) as “remote 4”. Client device data 222 may associate “remote 2” with game device 104(2) and “remote 4” with DVD 104(4). Further, client device data 222 may associate game device 104(2) with an input “input 2” and DVD 104(4) with an input “input 1” of an I/O interface, such as I/O interface 108. Accordingly, client device data 222 in this example may directly or indirectly associate “remote 2” and “remote 4” with “input 2” and “input 1” respectively. A variety of other examples are also contemplated.

Manipulation by a user is detected of one of the plurality of remote control devices (block 304). For example, the detection module 218 of FIG. 2 may be executed to detect when one of the plurality of remote control devices 106 is manipulated by a user. A variety of techniques to detect one of a plurality of remote control devices 106 in an A/V system are contemplated. For example, the detection may include interception of commands or other inputs sent to the plurality of client devices 104. The intercepted command may include data sufficient to identify a particular one of the plurality of remote controls devices 106 that sent the command. In another example, manipulation of the remote may cause identifying data intended for the detection module 218 to be transmitted, e.g., transmission of particular code or identifier directly to the detection module 218.

In an implementation, identifying data may be transmitted each time a key of a remote control is depressed. The identifying data may be the remote code transmitted when a key is depressed, a separate code, a distinct identifier and/or a combination thereof. In another technique, identifying data may be transmitted when a particular key is manipulated, such as a user pressing a power on key. In a further example, a remote may include modes such as a lower power “sleep mode” and a “wake mode”. The transmitting of identifying data in this example may occur when a mode change occurs, such as upon switching from “sleep mode” to “wake mode”.

In yet another example, a remote device may include functionality to detect motion, such as an accelerometer or gyroscope. In this example, identifying data may be transmitted responsive to the remote control being “picked-up” by the user. In other words, communication of identifying data occurs based on motion of the remote control and before/without the user operating keys, buttons, or other input functionality provided with the remote control. Thus, when a user manipulates a remote in a particular manner, the detection module 218 may receive and process identifying data to determine which remote of the plurality of remote control devices 106 is being used. It is noted that a variety of configurable options to select options for detection of plurality of remote control devices 106 may be provided via the detection module 218.

Based on the detection, an output of a display device is set to present audio visual outputs from a client device that is associated with the detected remote control device (block 306). For example, when the gamepad 106(2) of the previous example is manipulated by a user, the detection module 218 may receive identifying data corresponding to the gamepad 106(2). Based on the identifying data, detection module 218 may reference client device data 222 to determine that the manipulated remote corresponds to “remote 2” and the association of “remote 2” to one of the plurality of client devices 104, e.g. game device 104(2). Further, detection module 218 may determine that “remote 2” is associated via the client device data 222 with “input 2” of the I/O interface 108.

The I/O selector module 220 may be executed to set the I/O interface 108 to present audio visual output corresponding to the game device 104(2). More particularly, the I/O selector module 220 may operate to cause the I/O interface 108 to select “input 2”. In this manner, audio visual outputs from the game device 104(2) that is associated with the detected gamepad 106(2) control device (e.g., “remote 2”) are presented via the display device 102.

In the example of FIG. 2, the output manager module 110 and the I/O interface 108 are provided as components of the same device, e.g., set-top box 104(1). In this arrangement, the I/O selector module 220 may be configured to communicate instructions to set the I/O interface 108 locally within the set-top box 104(1).

In other examples, the output manager module 110 and the I/O interface 108 may also be implemented separately, such as the output manager module 110 residing on one of the plurality of client device 104 of FIG. 1 while the I/O interface 108 is configured as a stand-alone device or implemented as a component of the display device 102. In these examples, the I/O selector module 220 may be configured to cause external communication to set the I/O interface 108, such as communicating radio frequency (RF) signals between one of the plurality of client devices 104 and an I/O interface 108 integrated with the display device. A variety of other examples are also contemplated.

Figure 4:
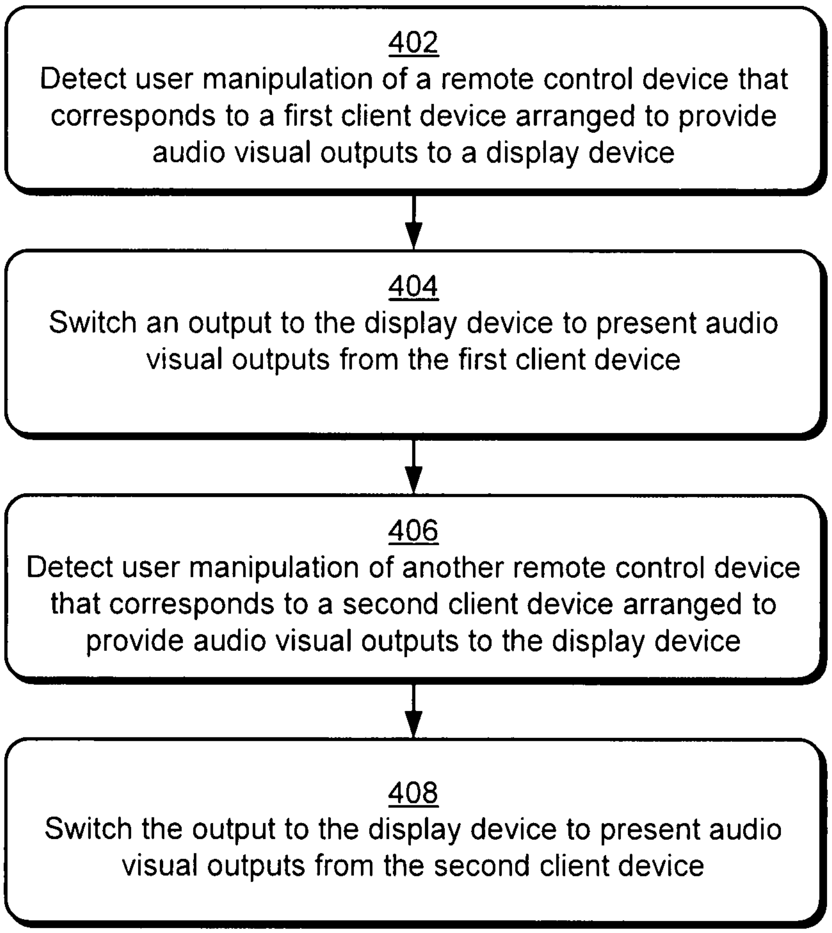
FIG. 4 is a flow diagram depicting a procedure in an exemplary implementation in which output to a display device is switched between client devices based on user manipulation of corresponding remote control devices.

FIG. 4 depicts a procedure 400 in an exemplary implementation in which output to a display device is switched between client devices based on user manipulation of corresponding remote control devices. User manipulation of a remote control device that corresponds to a first client device arranged to provide audio visual outputs to a display device is detected (block 402). For example, a user interacting with components of the environment 100 of FIG. 1 may manipulate a set-top box remote 106(1) to view television content 212 discussed with respect to FIG. 2. Set-top box remote 106(1) may correspond to set-top box 104(1) which is connected to display device 102 via the I/O interface 108. More particularly, the set-top box 104(1) may be arranged to provide selected television content 212 for presentation on the display device 102 via the I/O interface 108. In this example, set-top box 104(1) may be connected to a first input "component 1" of the I/O interface 108.

When the user manipulates set-top box remote 106(1), the output manager module 110 of FIG. 1 may include functionality to receive data and process the data to identify the set-top box remote 106(1). More particularly, the output manager module 110 may identify the set-top box remote 106(1) from the plurality of remote control devices 106, each of which may be associated with a different one of the plurality of client devices 104 that are connected via I/O interface 108 to the display device 102. In this manner, output manager module 110 may understand which of the plurality of remote control devices 106 is being manipulated.

An output to the display device is switched to present audio visual outputs from the first client device (block 404). Continuing with the preceding example, the output manager module 110 may include functionality to determine based on the received identifying data that the set-top box remote 106(1) is associated with the set-top box 104(1) and accordingly also associated with first input "component 1" of the I/O interface 108. Thus, in response to detection of the set-top box remote 106(1), the output manager module 110 may include functionality to cause the I/O interface 108 to switch an output to the display device 102 to correspond to the first input "component 1". Thus, television content 212 may then be presented on the display device 102 to the user via the I/O interface 108 and in particular, the first input "component 1"

User manipulation of another remote control device that corresponds to a second client device arranged to provide audio visual outputs to the display device is detected (block 406). After watching television content 212 for a period of time, the user in the previous example may decide to play a game on the game device 104(2). The user may accordingly "pick-up" and "power-on" gamepad 106(2) to begin interactions with the game device 104(2). Game device 104(2) may be arranged to provide game data for presentation on the display device 102 via the I/O interface 108. In this example, the game device 104(2) may be connected to a second input "component 2" of the I/O interface 108.

In accordance, with previously described techniques, "picking-up", "powering-on" and/or other user manipulations of the gamepad 106(2) may cause identifying data to be transmitted. The output manager module 110 of FIG. 1 may include functionality to receive and process the data to identify the gamepad 106(2). Thus, output manager module 110 may operate to determine that the gamepad 106(2) in now being manipulated by the user.

Output to the display device is switched to present audio visual outputs from the second client device (block 408). In the above example, the output manager module 110 determines, based on the received identifying data, that the gamepad 106(2) is associated with the game device 106(2) and also associated with second input "component 2" of the I/O interface 108. Thus, in response to detection of the gamepad 106(2), the output manager module 110 may cause the I/O interface 108 to switch the output to the display device 102 to correspond to the second input "component 2" automatically and without further user intervention. Game data may then be presented on the display device 102 to the user via the I/O interface 108 and in particular, the second input "component 2"

Procedure 400 may be successively repeated as different respective ones of the plurality of remote control devices 106 are manipulated by a user. In this manner, output to a display device 102 may be selected according to which particular remote of a plurality of remote control devices 106 is being manipulated by a user at a particular time. The switching of the output occurs automatically without a user manually setting the inputs/outputs. In other words, the user is not required to manually specify, select, or otherwise set inputs and outputs each time the user interacts with a different one of the plurality of client devices. Rather, output manger module 110 may be configured to access data (e.g., client device data 222) describing the arrangement of the plurality of client devices 104, which permits setting of the I/O interface 108 automatically and without user intervention.

Figure 5:
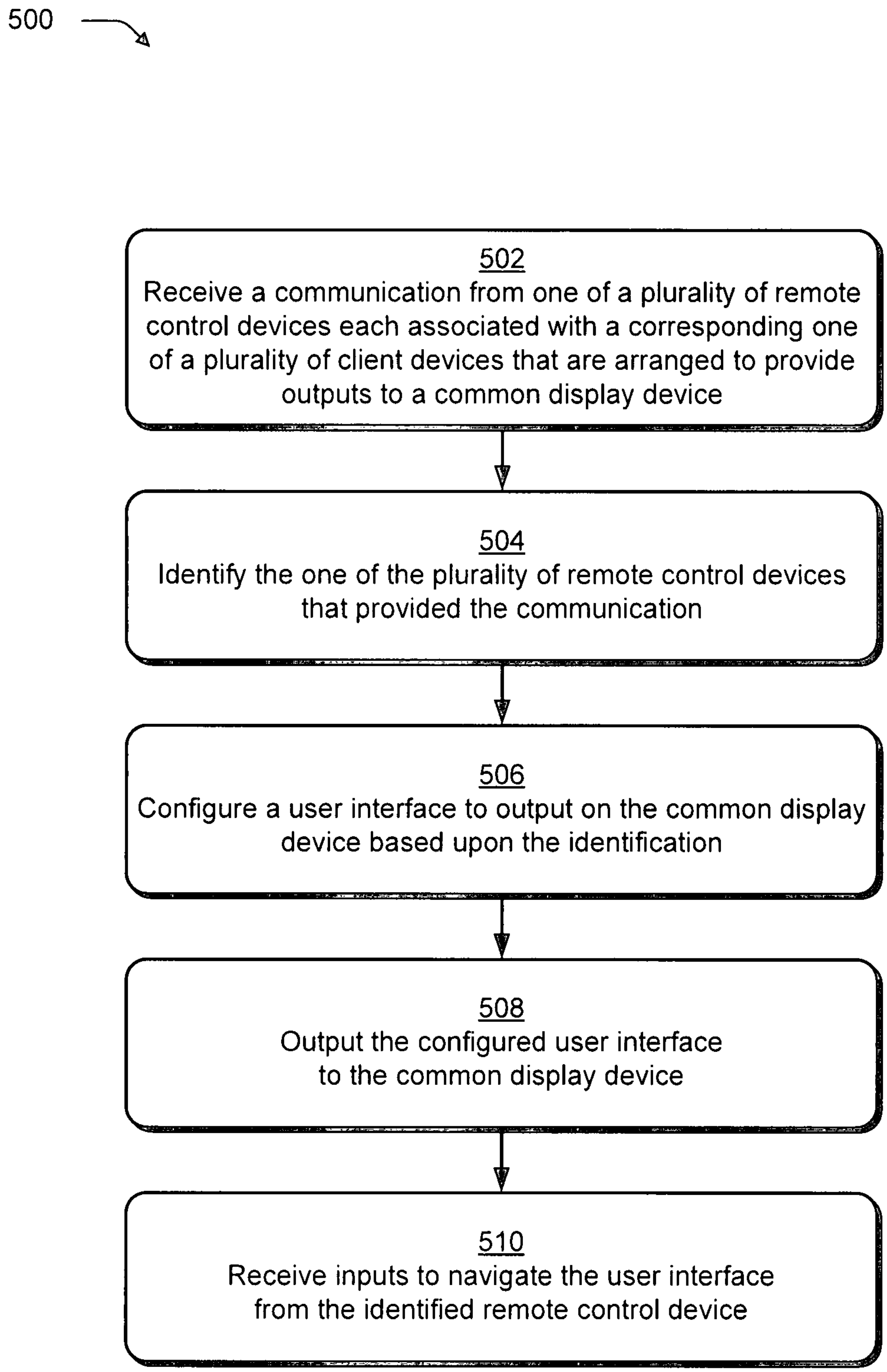
FIG. 5 is a flow diagram depicting a procedure in an exemplary implementation in which a user interface output by a client is configured based on upon detection of a corresponding remote control device.

FIG. 5 depicts a procedure 500 in an exemplary implementation in which a user interface output by a client is configured based upon detection of a corresponding remote control device. A communication is received from one of a plurality of remote control devices each associated with a corresponding one of a plurality of client devices that are arranged to provide outputs to a common display device (block 502). As indicated previously, each of the plurality of client devices 104 of FIG. 1 may be arranged to provide A/V outputs to a common display device 102 and may each correspond to a respective one a plurality of remote controls 106. When one of the plurality of remote controls 106 is manipulated by a user, the manipulation may cause transmission of a communication which may be processed to identify the particular remote control.

For example, a user may manipulate DVD remote 106(4) of FIG. 1 to interact with the DVD 104(4) device, such as to "power on" the DVD 104(4) device. This manipulation by the user may cause a "power on" command to be communicated by the DVD remote 106(4). Output manager module 110 may be configured to intercept or otherwise receive the "power on" command. A variety of other inputs, codes, instructions and/or commands communicated from the plurality of remote control devices 106 may be received and/or monitored by the output manager module 110.

One of the plurality of remote control devices that provided the communication is identified (block 504). Continuing with the previous example, the communication received from DVD remote 106(4) by output manager module 110 may include identifying data. The output manager module 110 may include a detection module 218 or equivalent functionality to process the identifying data to determine which of the plurality of remote control devices 106 is being manipulated. In an implementation, detection module 218 may use the included identifying data to reference client device data 222 and determine which of a plurality of the remote controls 106 is being manipulated. Thus, detection module 218 may operate to identify a particular one of the plurality of remote control devices 106 based on the received communication.

Identifying data may be automatically provided, such as when the "power on" command is communicated. Additionally or alternatively, remote control device may transmit a communication include identifying data upon selection of other buttons or responsive to other types of user manipulation, e.g., "picking-up", pressing a dedicated button, and so on. Identifying data may be configured in various ways such as unique numbers, product codes, remote codes, or other data which is suitable to identify a corresponding one of the plurality of remote control device 106.

A user interface to output on the common display device is configured based upon the identification (block 506). Once a manipulated remote is identified, techniques described with respect to FIGS. 3-4 may be employed to set an output of a display device 102 to present A/V output that corresponds to the indentified remote and an associated client device. Thus, playback of a movie from DVD player 104(4) may be presented on the display device 102 based on the detection/identification of DVD remote 106(4). Additionally or alternatively, a user interface for output on the display device 102 that corresponds to the identified remote control device and/or functional capabilities of the remote control device may be configured by one or more of the plurality of client devices 104.

For instance, a user interface generated by one of the plurality of client devices 104 may be accessible via one of the plurality of remote control devices 106 which may be associated with a different one of the plurality of client devices 104. Each of a plurality of remotes may include "guide" functionality operable to cause set-top box 104(1) of FIG. 2 to output a user interface 226 configured as an electronic programming guide (EPG). In another instance, each of a plurality of remote control device 106 may include "DVR list" functionality operable to cause DVR 104(5) to output a user interface that displays a list of recorded content. A variety of other instances are also contemplated.

The plurality of remote controls 106 may each be configured with a variety of different functionality. Examples of different types of functionality that may be provided include but are not limited to: directional input keys (e.g., arrows); an alphanumeric key pad, a joystick, a thumb-wheel, a numeric keypad, a trackball, a touch pad, a scroll wheel; position and or motion inputs; and so forth. A user interface output by one of the plurality of clients 104 may be configured based upon which of the plurality of remote controls 106 is identified and/or corresponding functionality.

For example, a user watching the movie playback in the previous example may manipulate the DVD remote 106(4) to enter a guide or menu mode. In an implementation, the DVD remote 106(4) may be operable to cause output of a user interface from another one of the plurality of client devices 104, such as display of user interface 226 from set-top box 104(1) of FIG. 2.

The user interface 226 output by set-top box 104(1) may be configured as an EPG that arranges guide data 214. The guide data 214 in the EPG may be arranged in a grid format when identified DVD remote 106(4) includes four-way directional input keys. The same guide data 214 may be arranged in horizontally scrollable rows, when the DVD remote 106(4) has a horizontal thumb-wheel instead of directional input keys. When a different one of remote control devices 106 is identified, the user interface 226 is configured to match the identified remote control and/or functional capabilities of the remote control device.

Thus, when an alphanumeric keypad is included with an identified one of the remote control devices 106, the user interface 226 may be configured with functionality to accept textual inputs. When position and motion detection functionality is included, the user interface 226 may be configured with functionality to respond to position and motion inputs, such as a velocity input generated by user manipulation of remote control. A variety of other examples are also contemplated.

In an implementation client device data 222 and/or user interface data 224 may include data describing the functional capabilities of the plurality of remote control devices 106. This data may be referenced to configure a corresponding user interface 226. For example, communication module 206 illustrated in FIG. 2 may learn from detection module 218 that DVD remote 106(4) has been identified and may reference related client device data 222 and/or user interface data 224 to output user interface 226 that corresponds to DVD remote 106(4) and/or the functional capabilities of DVD remote 106(4).

The configured user interface is output to the common display device (block 508). In the above example, a user interface 226 configured by communication module 206 to correspond to the identified DVD remote 106(4) maybe output to the display device 102. The display device 102 may display user interface 226 along with the DVD playback from DVD 104(4) device, such as in different portions of user interface 226, side-by-side, using overlays and so forth.

Inputs to navigate the user interface are received from the identified remote control device (block 510). For example, the user may manipulate DVD remote 106(4) to provide inputs to navigate the EPG output on the display device. Navigation may occur according to particular functionality of the DVD remote 106(4). Thus, when DVD remote 106(4) includes a trackball, navigation may occur via the trackball. Further, the EPG may be arranged in a manner suitable for navigation by the trackball. Accordingly, a user experience may be customized based upon which of a plurality of remotes 106 in an A/V system the user manipulates to interact with the system.

Figure 6:
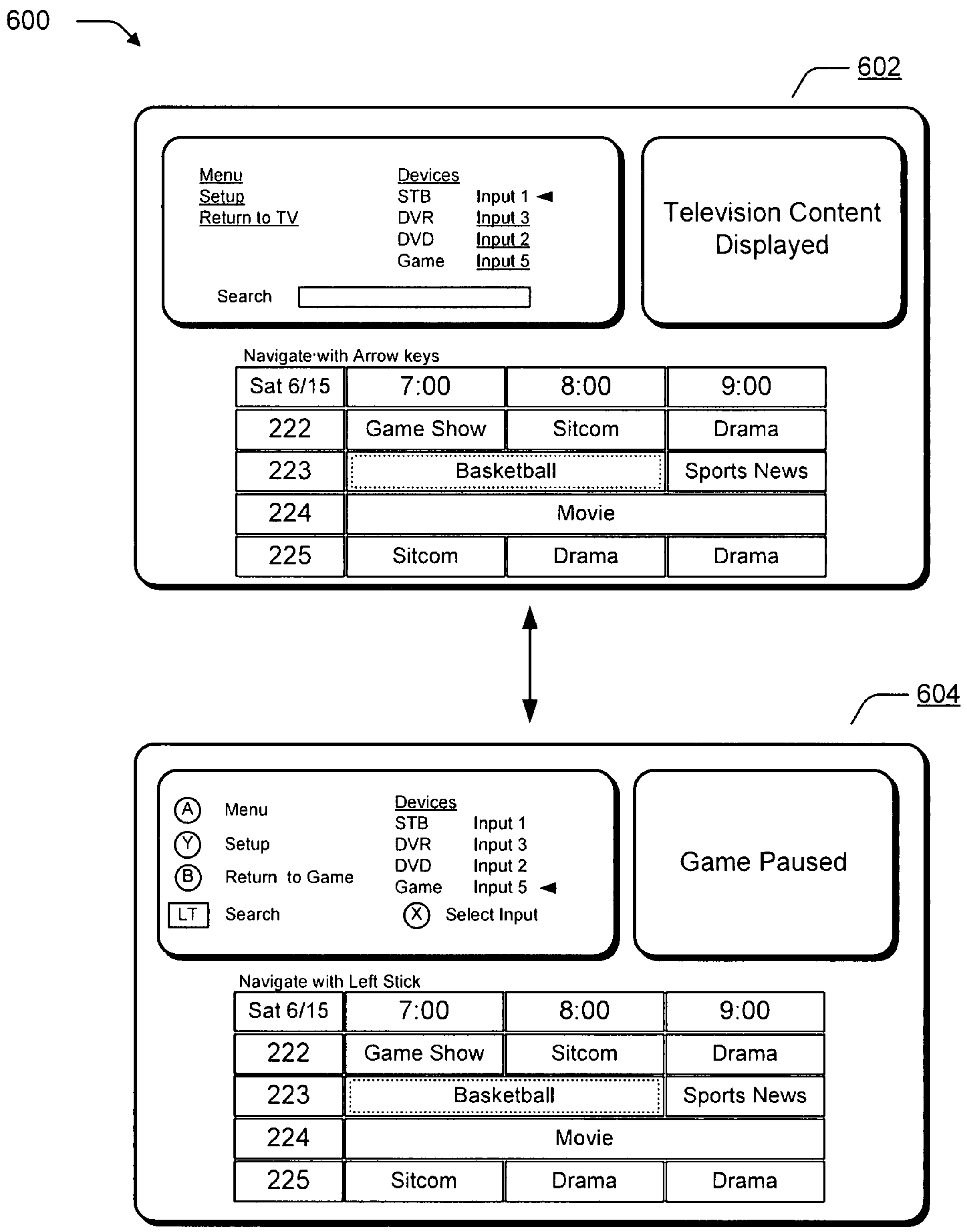
FIG. 6 is an illustration of exemplary user interfaces which may be configured and output based upon corresponding remote control devices.

FIG. 6 is diagram depicting exemplary user interfaces configured based on upon detection of corresponding remote control devices. Interfaces 602 and 604 are depicted which represent alternate presentations of the same guide data 214. Interfaces 602 and 604 may represent an EPG that may be configured and output by set-top box 104(1) in a home entertainment system to present the guide data 214, as well as other information.

In the depicted example, interface 602 corresponds to a set-top box remote 106(1) and may accordingly be output when techniques described herein identify a user interacting with the home entertainment system via set-top box remote 106(1). Interface 604 corresponds to a gamepad 106(2) and may accordingly be output when techniques described herein identify a user interacting with the home entertainment system via gamepad 106(2). A variety of other examples are also contemplated.

The depicted interfaces 602, 604 are each configured with custom features that correspond to functionality of particular one(s) of the plurality of remote controls 106. Thus, the user interface 602 includes customizations suitable for interaction via the set-top box remote 106(1). In particular, the menu is configured as selectable links. The displayed guide data 214 may be navigable using direction arrows of the set-top box remote 106(1). The set-top box remote 106(1) may include an alpha-numeric keypad, thus a search portion is provided that may accept direct textual inputs. A content display portion is illustrated which presents corresponding output. In this case, television content 112 from set-top box 104(1) associated with the set-top box remote 106(1) is shown. Output selection for the content display portion may occur based on a detected/identified remote in accordance with techniques described herein.

Likewise, the user interface 602 includes customizations suitable for interaction via the gamepad 106 (2). In particular, the menu is configured to be operated via a plurality of different buttons of the gamepad 106(2). The displayed guide may be navigable using a joystick of the gamepad 106(2). Since gamepad 106(2) may not include an alpha-numeric keypad, a search function is depicted as accessible via one of the plurality of different buttons of the gamepad 106(2). A content display portion again presents corresponding output, in this case game data from game device 104(2) associated with the gamepad 106(2). Thus, interfaces 602, 604 depict one example of how a user interface may be configured according to a detected remote control device. A variety of other examples of user interfaces customized according to a detected remote control device are contemplated.

In an implementation, a switch between user interfaces may occur automatically as a user switches between different ones of the plurality of remote controls 106. Thus, while a user manipulates the set-top box remote 106(1), interface 602 may be presented. If the user switches to using the game-pad 106(2), the presentation may automatically switch to interface 604. If the user then returns to using set-top box remote 106(1), the presentation may switch back to user interface 602. Similarly, if another one of the plurality of remote control devices 106 is selected, a corresponding user interface may be configured and output.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:

associating each of a plurality of remote control devices with a respective one of a plurality of client devices, each of the plurality of client devices being arranged to provide a corresponding audio visual output to a common display device;

detecting user manipulation other than operation of a key of a remote control of the plurality of remote control devices;

automatically in response to the user manipulation switching an output to the common display device to present the said corresponding audio visual output of the client device that is associated with the manipulated remote control;

determining a particular functional capability of the manipulated remote control; and configuring a user interface for presentation via said corresponding audio visual output to include customized features that match the determined particular functional capability of the manipulated remote control by changing one or more visual features of the user interface to match the determined particular functional capability of the manipulated remote control.

2. A method as described in claim 1 further comprising:

detecting user manipulation of another said remote control device that is associated with another said client device; and switching the output to the display device to present the audio visual output corresponding to the other client device.

3. A method as described in claim 1, wherein the detecting further comprises:

receiving data to identify the user manipulation of the remote control device, the data transmitted responsive to the user manipulation; and identifying the client device associated with the manipulated remote control device based on the received data.

4. A method as described in claim 1, wherein the switching further comprises:

indentifying a connection to an interface device, the connection corresponding to the client device associated with the manipulated remote control and arranged to provide the audio visual output corresponding to the client device to the display device; and configuring the interface device to provide output to the display device via the identified connection.

5. A method as described in claim 4, wherein the interface device is a component of the display device.

6. A method as described in claim 4, wherein the interface device is a component of one said client device of the plurality of client devices.

7. A method as described in claim 4, wherein the interface device:

includes a plurality of connections to communicatively couple said audio visual outputs corresponding to each of the plurality of client devices to the display device; and is selectively operable to provide different selected audio visual outputs from the plurality of client devices to the display device.

8. A method as recited in claim 1, wherein one said client device of the plurality of client devices is a set-top box configured to provide television content for presentation on the display device.

9. A method as recited in claim 8, wherein the set-top box includes an interface to communicatively couple said audio visual outputs corresponding to each of the plurality of client devices to the display device.

10. A method as recited in claim 1, wherein the associating further comprises storing data describing the arrangement of the plurality of client devices and associations between the plurality of client devices and the plurality of remote control devices.

11. An apparatus comprising:

an interface including a plurality of connections, each connection to communicatively couple an audio visual output corresponding to one of a plurality of client devices to a display device, each client device having an associated remote control device, the interface operable to switch an output to the display device between the plurality of connections to present different respective audio visual outputs to the display device at different times; and one or more modules to:

detect user manipulation other than operation of a key of one said remote control device;

operate the interface to switch the output to the display device to a particular one of the plurality of connections that corresponds to a particular one of the plurality of client devices associated with the manipulated remote control to present the corresponding said audio visual output to the display device; and configure a user interface for presentation via said particular one of the plurality of connections to include customized features that match a determined particular functional capability of the manipulated remote control by changing a function of at least a portion of the user interface to correspond to the determined particular functional capability of the manipulated remote control.

12. An apparatus as recited in claim 11 wherein the one or more modules are further configured to:

receive identifying data from the manipulated remote control, determine which of the plurality of client devices is associated with the manipulated remote based on the received data; and indentify which of the plurality of connections corresponds to the determined client device.

13. An apparatus as described in claim 11 wherein the one or more modules include a communication module to obtain television content from a distribution server over a network and output the television content to the display device via the interface.

14. An apparatus as described in claim 11 wherein the plurality of client devices are each selected from a group consisting of: a set-top box, a game device, a personal computer; a digital video disc (DVD) player, a digital video recorder (DVR), a personal digital assistant; a mobile phone, an audio visual (A/V) receiver; a digital camera; a projector; and a portable multi-media player.

15. A method comprising:

receiving a communication from one of a plurality of remote control devices, each being associated with a corresponding one of a plurality of client devices arranged to provide respective audio visual outputs to a common display device;

identifying which of the plurality of remote control devices provided the communication and at least one functional capability of the identified remote control device; and configuring a user interface to interact with a corresponding client of the plurality of clients to include customized features that match the identified remote control device by changing a visual feature and a function of at least a portion of the user interface to match the at least one functional capability of the identified remote control device, the communication being sent by the identified remote control device responsive to motion of the remote control device and the user interface being configured to match the at least one functional capability of the identified remote control device.

16. A method as described in claim 15, wherein the user interface is configured as an electronic program guide (EPG) to interact with television content available to the corresponding client over a network from a distribution server.

17. A method as described in claim 15, wherein the user interface is configured to include functionality that corresponds to the identified one of the plurality of remote control devices.

18. A method as described in claim 15, wherein the configuring of the user interface includes obtaining user interface data from storage based upon the identified one of the plurality of remote input devices.

19. A method as described in claim 15, wherein the configuring of the user interface includes selecting one or more pre-configured user interfaces from storage based upon the identified one of the plurality of remote input devices.

20. A method as described in claim 15, further comprising outputting the configured user interface; and receiving inputs to operate the user interface, the inputs formed through user manipulation of the identified one of the plurality of remote input devices.

* * * * *